(No Model.)  2 Sheets—Sheet 1.

J. M. O'KELLY.
COIN LOCK FOR WEIGHING SCALES.

No. 419,544.  Patented Jan. 14, 1890.

WITNESSES:
Henry Huber
Earl Kurz

INVENTOR
James Morris O'Kelly
BY Goepel & Raegener,
ATTORNEYS (No Model.) 2 Sheets—Sheet 2.
J. M. O'KELLY.
COIN LOCK FOR WEIGHING SCALES.
No. 419,544. Patented Jan. 14, 1890.
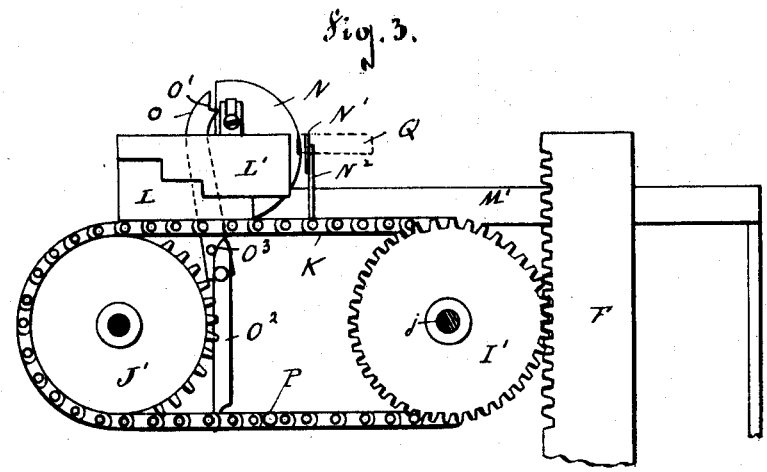
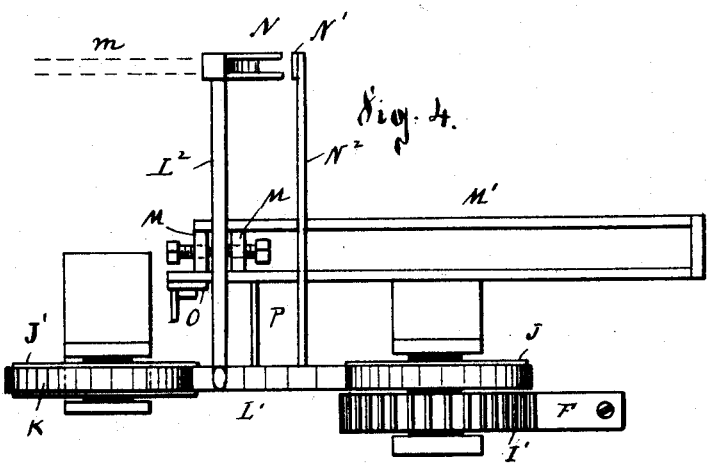
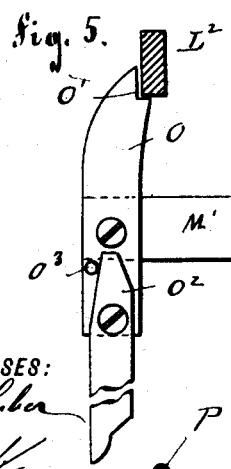
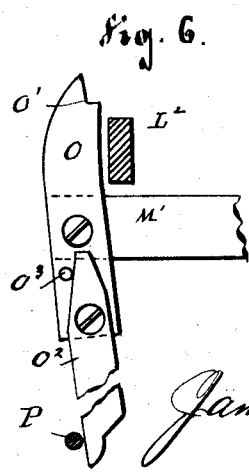
WITNESSES:
INVENTOR
James Morris O'Kelly
BY Goepel & Raegener
ATTORNEYS

UNITED STATES PATENT OFFICE.

JAMES M. O'KELLY, OF NEW YORK, N. Y., ASSIGNOR OF ONE-HALF TO GEORGE D. BAYAUD, OF SAME PLACE.

COIN-LOCK FOR WEIGHING-SCALES.

SPECIFICATION forming part of Letters Patent No. 419,544, dated January 14, 1890.

Application filed April 10, 1889. Serial No. 306,679. (No model.) Patented in England March 11, 1887, No. 3,730, and August 4, 1887, No. 10,707.

*To all whom it may concern:*

Be it known that I, JAMES MORRIS O'KELLY, of the city of New York, in the county of New York and State of New York, a subject of the Queen of Great Britain, have invented certain new and useful Improvements in Coin-Locks for Weighing-Machines, of which the following is a specification.

This invention was patented in Great Britain March 11, 1887, No. 3,730, and August 4, 1887, No. 10,707.

This invention relates to that class of weighing devices which are released upon depositing a coin; and the object of my invention is to provide a new and improved coin-lock for weighing devices for the purpose of locking the weighing device in such a manner that it cannot be used until a coin is deposited.

The invention consists in the construction and combination of parts and details, as will be fully described and set forth hereinafter, and finally pointed out in the claims.

Figure 1:
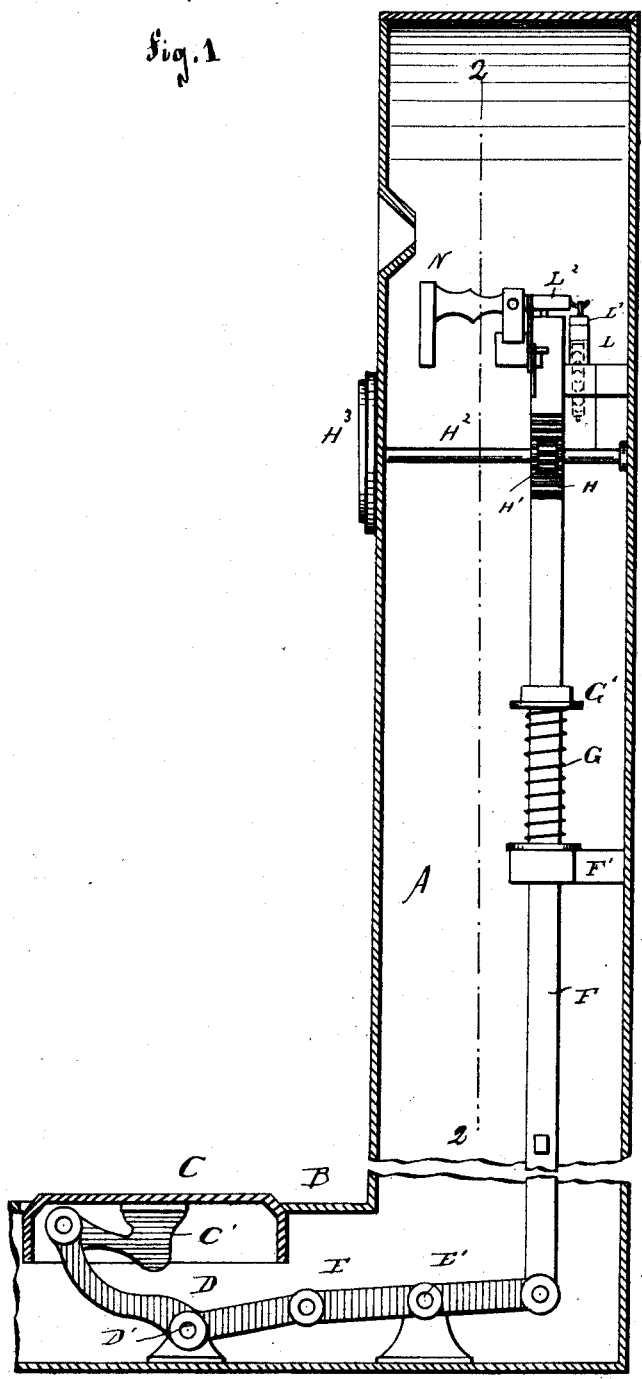
Figure 2:
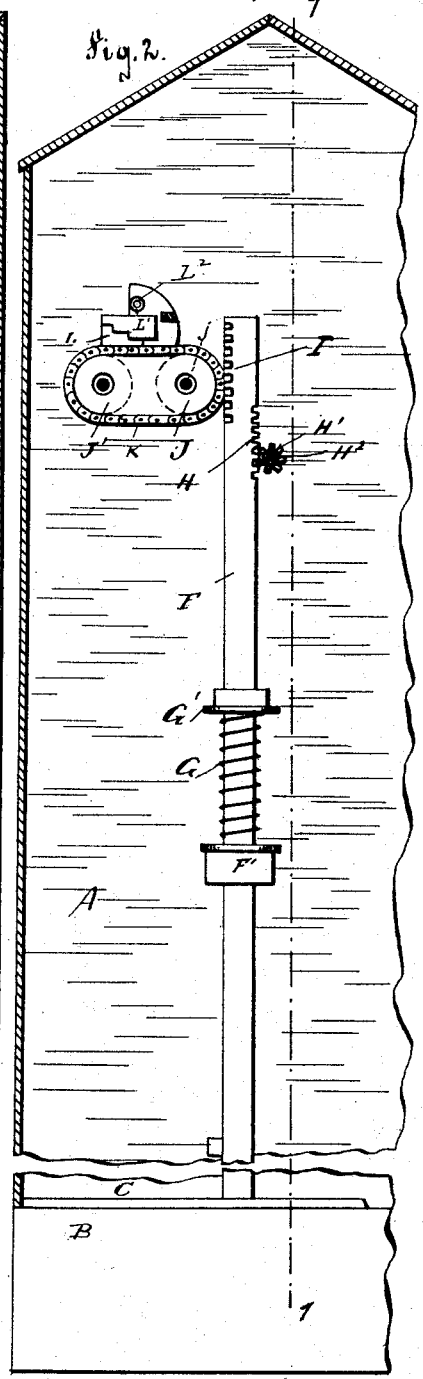

In the accompanying drawings, Figure 1 is a vertical transverse sectional view of a weighing apparatus provided with my improvement on the line 1 1, Fig. 2. Fig. 2 is a vertical longitudinal sectional view of the same on the line 2 2, Fig. 1. Fig. 3 is an enlarged detail side view of the mechanism for locking the weighing device, parts being in section. Fig. 4 is a top view of the same, parts being omitted. Figs. 5 and 6 are detail views of the latch in different positions.

Similar letters of reference indicate corresponding parts.

The upright casing A is provided with a horizontal base portion B, in an aperture of which the weighing-platform C is mounted to move vertically, said weighing-platform being connected with a bent lever C', fixed to said platform and pivoted to one end of the lever D, fulcrumed at D', the opposite end of said lever being pivoted to one end of the lever E, fulcrumed at E'. The opposite end of the lever E is pivoted to the lower end of a rod F, suitably guided in a guide-arm F' of the casing A, which rod is pressed upward by a helical spring G, surrounding it and bearing on the arm F', and a disk G', resting against a collar on said rod F. Said rod F is provided with a rack H, engaging a pinion H' on the shaft H², journaled in the casing A, which shaft H² is provided on its outer end with a suitable pointer for indicating the weight of the person on a dial H³ on the face of the casing. The bar F is also provided with a rack I, engaging a cog-wheel I' on the same shaft *j'* with the sprocket-wheel J, over which an endless chain K passes, which also passes over a sprocket-wheel J'. On the top part of said chain K a stepped or offset block L is secured, which is adapted to engage a like stepped or offset block L', suspended from the end of a lever L², pivoted between standards M, projecting from the arms M' of the casing. On the opposite end of the lever L a coin-pocket N is secured, against the open side of which the plate N' rests, which is secured on the end of an arm N², projecting laterally from the top part of the chain K, as shown in Fig. 3. The lever O, provided at its upper edge with a shoulder O', is pivoted to the arms M', and to the lower end of said lever O a latch O² is pivoted, the upper end of which can press against a pin O³, projecting from one side of the lever O. The bottom part of the chain K is provided with an arm P, that can act on the lower end of the latch O². A coin-chute *m* (shown in dotted lines in Fig. 4) serves to conduct the coin into the coin-pocket N on the lever L². A fixed stop Q projects from the casing adjacent to the right-hand end of the stop-block or latch L'.

The operation is as follows: When a person drops a coin of the proper weight into the coin-chute, the same passes into the coin-pocket N, in which it is retained by the plate N' adjacent to the open edge of said pocket. The weight of the coin causes that end of the lever L² to which said coin-pocket is secured to descend, whereby the block L', suspended from the opposite end of the lever L², is raised, the lever L² being raised to such an extent that it can engage and rest on the shoulder O' on the upper end of the lever O, which thus keeps the lever L² in the raised position and prevents the block L' from descending when the coin drops out of the pocket N. The person now steps on the weighing-platform C', and the same descends under the action of the weight of the person, thereby moving the rod F downward and compressing the spring G more or less, according to the weight of the person on the platform. As soon as the rod F descends the spring G is compressed and the upper part of the chain K is moved to the right, whereby the plate N' is moved from the open edge of the coin-pocket N, permitting the coin to drop out of the pocket, and the lower part of the chain is moved to the left. When the person leaves the platform, the spring G expands and moves the rod F upward, whereby the sprocket-wheels J J' are turned in such a manner as to move the bottom part of the chain K to the right and the upper part of the chain to the left—that is, the movement of the chain is the reverse of that when the rod F is moved downward by the weight of the person. The parts of the chain only travel a short distance in one direction and the same distance in the reverse direction. The pin or arm P, which is now at the left-hand edge of the latch $O^2$, strikes said latch and swings its lower end to the right, whereby the upper end of the lever O is swung to the left and disengaged from the lever $L^2$, thus permitting the block L' to descend and engage the block L, whereby the entire mechanism is locked. If a person steps on the platform, but has not deposited a coin, the device cannot operate, as the block L would tend to move the block L' to the right, this being prevented by the stop Q, against which said block L' abuts.

Having thus described my invention, I claim as new and desire to secure by Letters Patent—

1. The combination, with a weighing-platform, of a rod or bar connected with and operated by the weighing-platform, a chain operated by said rod, a block on said chain, a pivoted lever, a block suspended from one end of said pivoted lever and adapted to engage the block on the chain, and a coin-pocket on the opposite end of said lever, substantially as set forth.

2. The combination, with a weighing-platform, of a rod or bar connected with and operated by the same, a chain operated by said bar or rod, a block on said chain, a pivoted lever, a block suspended from one end of said pivoted lever and adapted to engage the block on the chain, a coin-pocket on the opposite end of the lever, one edge of which coin-pocket is open, and a plate for closing said open edge of the coin-pocket, which plate is connected with the chain, substantially as set forth.

3. The combination, with a weighing-platform, of a rod or bar connected with and operated by said platform, a chain operated by the rod or bar, a block on said chain, a pivoted lever, a block suspended from one end of the pivoted lever, a coin-pocket on the other end of said lever, an additional pivoted lever for holding one end of the lever carrying the coin-pocket in the raised position, a latch pivoted to said additional lever, and an arm on the chain adapted to act on said latch, substantially as set forth.

In testimony that I claim the foregoing as my invention I have signed my name in presence of two subscribing witnesses.

JAMES M. O'KELLY.

Witnesses:
OSCAR F. GUNZ,
JOHN A. STRALEY.